United States Patent
Smith et al.

(10) Patent No.: US 11,774,544 B2
(45) Date of Patent: Oct. 3, 2023

(54) CONTROL SYSTEM FOR CONTROLLING A PROJECTILE

(71) Applicant: BAE SYSTEMS plc, London (GB)

(72) Inventors: Andrew James Smith, Great Baddow (GB); Martin John White, Great Baddow (GB); Guiseppe Carlos Sarno, Great Baddow (GB)

(73) Assignee: BAE SYSTEMS PLC, London (GB)

( * ) Notice: Subject to any disclaimer, the term of this patent is extended or adjusted under 35 U.S.C. 154(b) by 1041 days.

(21) Appl. No.: 16/469,954

(22) PCT Filed: Nov. 29, 2017

(86) PCT No.: PCT/GB2017/053592
§ 371 (c)(1),
(2) Date: Jun. 14, 2019

(87) PCT Pub. No.: WO2018/109435
PCT Pub. Date: Jun. 21, 2018

(65) Prior Publication Data
US 2019/0323807 A1    Oct. 24, 2019

(30) Foreign Application Priority Data

Dec. 14, 2016  (GB) ...................................... 1621223
Jan. 12, 2017  (EP) ..................................... 17151161

(51) Int. Cl.
*G01S 5/02* (2010.01)
*F42B 15/01* (2006.01)
(Continued)

(52) U.S. Cl.
CPC ............ *G01S 5/0246* (2020.05); *F42B 15/01* (2013.01); *G01S 1/08* (2013.01); *G01S 5/0242* (2013.01);
(Continued)

(58) Field of Classification Search
CPC . F42B 15/01; G01S 1/08; G01S 1/028; G01S 5/0045; G01S 5/0242; G01S 5/14;
(Continued)

(56) References Cited

U.S. PATENT DOCUMENTS 5,344,099 A  *  9/1994  Pittman ..................... F41G 7/28
                                                 244/3.13
6,259,400 B1    7/2001  Higgins et al.
(Continued)

FOREIGN PATENT DOCUMENTS

EP    2866046 A1    4/2015
WO    0165271 A1    9/2001
(Continued)

OTHER PUBLICATIONS

International Preliminary Report on Patentability received for PCT Application No. PCT/GB2017/053592, dated Jun. 27, 2019. 10 pages.
(Continued)

*Primary Examiner* — Marcus E Windrich
(74) *Attorney, Agent, or Firm* — Finch & Maloney PLLC

(57) ABSTRACT

According to an aspect of the invention, there is provided a control system for controlling a projectile, the control system comprising: a plurality of transmitters, wherein each transmitter of the plurality of transmitters is arranged to transmit an electromagnetic wave from a transmission position; a receiver associated with the projectile, the receiver being arranged to receive a plurality of electromagnetic waves transmitted from the plurality of transmitters; a controller associated with the projectile, the controller being arranged to: determine at least one of a position, a velocity or an acceleration of the projectile from transmission positions of the plurality of transmitters and Doppler measurements derived from the received plurality of electromagnetic
(Continued)

waves; and generate a control signal for performing an action with the projectile depending on the determined at least one of position, velocity or acceleration of the projectile.

20 Claims, 6 Drawing Sheets

(51) Int. Cl.
| | |
|---|---|
| *G01S 1/08* | (2006.01) |
| *F41G 7/34* | (2006.01) |
| *F42C 13/04* | (2006.01) |
| *G01S 1/02* | (2010.01) |
| *G01S 5/00* | (2006.01) |
| *G01S 5/14* | (2006.01) |
| *G01S 11/10* | (2006.01) |
| *G01S 19/18* | (2010.01) |
| *G05D 1/10* | (2006.01) |

(52) U.S. Cl.
CPC ............... *F41G 7/34* (2013.01); *F42C 13/04* (2013.01); *G01S 1/028* (2013.01); *G01S 5/0045* (2013.01); *G01S 5/14* (2013.01); *G01S 11/10* (2013.01); *G01S 19/18* (2013.01); *G05D 1/107* (2013.01)

(58) Field of Classification Search
CPC .......... G01S 11/10; G01S 19/18; G01S 19/48; F41G 7/34; F42C 13/04; G05D 1/107
See application file for complete search history.

(56) References Cited

U.S. PATENT DOCUMENTS

| | | | |
|---|---|---|---|
| 6,483,455 B2* | 11/2002 | Fleury .................... | F41G 7/305 244/3.21 |
| 7,023,380 B2* | 4/2006 | Schneider ............. | G01S 5/0247 342/442 |
| 9,070,236 B1 | 6/2015 | DiEsposti | |
| 9,605,934 B1* | 3/2017 | Shefer ...................... | H03C 1/00 |
| 2005/0031125 A1* | 2/2005 | Acampora, Jr. ........ | G01S 19/05 380/270 |
| 2010/0059622 A1* | 3/2010 | Rastegar ................. | F41G 7/305 701/469 |
| 2010/0289687 A1 | 11/2010 | Vander Velde et al. | |
| 2010/0295720 A1* | 11/2010 | Rastegar .................. | F41G 7/28 342/62 |
| 2011/0238307 A1 | 9/2011 | Psiaki et al. | |
| 2012/0086606 A1* | 4/2012 | Mathews ................ | G01S 11/10 342/461 |
| 2012/0262334 A1* | 10/2012 | Rastegar ................. | F41G 7/346 342/357.29 |
| 2013/0001354 A1* | 1/2013 | Meyer ..................... | F42B 15/01 244/3.19 |
| 2016/0273880 A1* | 9/2016 | Dryer ...................... | F42C 13/04 |

FOREIGN PATENT DOCUMENTS

| | | |
|---|---|---|
| WO | 2012024021 A2 | 2/2012 |
| WO | 2013105093 A1 | 7/2013 |
| WO | 2018109435 A1 | 6/2018 |

OTHER PUBLICATIONS

International Search Report and Written Opinion received for PCT Application No. PCT/GB2017/053592, dated Mar. 1, 2018. 17 pages.

GB Search Report under Section 17(5) received for GB Application No. 1621223.5, dated Jul. 25, 2017. 3 pages.

Extended European Search Report received for EP Application No. 17151161.1, dated Jul. 20, 2017. 9 pages.

* cited by examiner

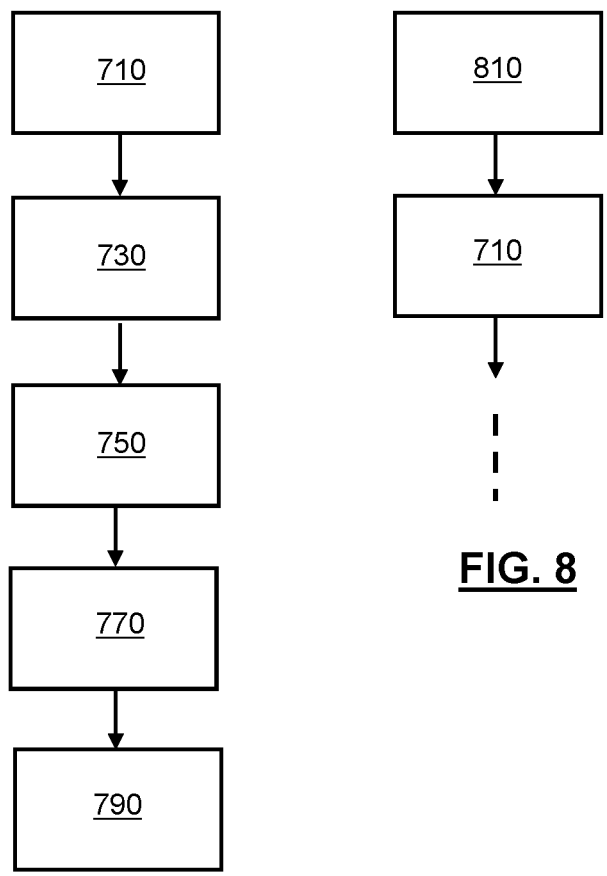

CONTROL SYSTEM FOR CONTROLLING A PROJECTILE

The present invention relates generally to controlling a projectile, and more particularly to apparatus and methods for use in such control.

A projectile, for example a shell or similar, may be fired from a ranged weapon toward a target. The ranged weapon may, for instance, be a tank, a piece of artillery or munition, a missile platform, and so on—something that can fire a projectile over a distance. The projectile can also be controlled to perform an action in one of a number of ways. The projectile may be a steerable projectile, able to actively alter its trajectory as it travels the distance, and/or the projectile may comprise a pay-load and a fuze for detonating the pay-load. For example, the projectile can be a munition that can be steered or navigated, i.e. controlled, based on its location. In order to steer the projectile toward the intended target, a Global Navigation Satellite System GNSS, i.e. a Global Positional System GPS, receiver and an Inertial Measurement Unit IMU can be provided inside the projectile to provide a positioning solution for a guidance section of the projectile.

However, reliance on the GNSS can be problematic because the GNSS is prone to reliability and accuracy issues caused by spoofing and/or interference. Robustness against such spoofing or interference of GNSS can be provided by inclusion of anti-jam capabilities requiring specifically designed antennas and algorithms. Use of GNSS receivers with multiple channels, high sensitivities and improved algorithms allowing for robust operation can help address this vulnerability of the GNSS to some degree. Use of other sensors for aiding navigation, such as pressure sensors for height determination and optical flow sensors for platform velocity determination can also help with addressing this vulnerability of the GNSS. However, fundamentally, the navigation's heavy reliance on the GNSS means the control of the projectile will always suffer from problems arising from this vulnerability. For example, there is no resilience, or indeed no solution, to a complete denial or failure of GNSS when the GNSS is used for the navigation of the projectile. Further, an output from an IMU, on its own, often drifts drastically with time, and a dead reckoning solution obtained from this would correspondingly degrade by an unacceptable magnitude. Moreover, spin-stabilised projectiles travel through the air spinning at a high rotational rate about an axis. A GNSS receiver tends to struggle with dealing with such a spin. This results in a significant reduction of the GNSS signal quality and also signal availability depending on the position of the GNSS receiver antennas on the spinning projectile.

The projectile can also be controlled to perform a different kind of action. In one example, it may be desirable for the projectile to air-burst—i.e. explode or similar without impact using timed fuzes. The fuze of such a projectile might be initiated upon firing of the projectile. An initial, or muzzle, velocity of the projectile is assumed as a typical or otherwise predetermined velocity, and used in a calculation where such velocity, and the timer, can be used to activate the fuze at a certain distance from a firing origin location. If the actual muzzle velocity is the same as the predetermined or assumed velocity, then this approach can be used to quite accurately control the location at which air-burst of the projectile takes place. However, in practice, there can be quite a wide range in the actual muzzle velocity, meaning that a pre-determined muzzle velocity used in a distance-to-burst calculation is not always accurate. Of course, it is desirable to improve the accuracy of such air-burst projectiles, wherever possible and practical.

One approach to improving the air-burst timing accuracy has been to use the rotation of a projectile about its longitudinal axis (e.g. its turn count) during the projectile's trajectory from firing origin to target location. The rotation of the projectile about its longitudinal axis is largely determined by the rifling of the barrel from which the projectile is fired. So, the rotational rate or frequency of the projectile is known in advance. Therefore, if the projectile is known to rotate a certain number of times from firing, possibly with some in-built calibration for rotational rate decay due to air resistance or similar, then the fuze within a projectile can be activated when a certain number of turns have been counted. This turn-count will equate to a certain distance from the firing origin, which can be used to ensure that the projectile air-bursts at a particular distance from the firing origin, or in other words at a particular target location. However, this assumption is based on the turn-count being measured accurately and consistently but such accurate measurement is not always possible. For instance, with current electro-mechanical sensors or similar, it may not be possible to sense the rotational frequency of the projectile with sufficient accuracy, if at all.

In general, then, present methods and apparatuses for controlling a projectile to perform an action, such as steering the projectile or activating a fuze therein, are not sufficiently robust, accurate or reliable.

It is therefore an example aim of example embodiments of the present invention to at least partially obviate or mitigate at least one disadvantage of the prior art, whether identified herein or elsewhere, or to at least provide a viable alternative to existing apparatus and methods.

According to a first aspect of the invention, there is provided a control system for controlling a projectile, the control system comprising: a plurality of transmitters, wherein each transmitter of the plurality of transmitters is arranged to transmit an electromagnetic wave from a transmission position; a receiver associated with the projectile, the receiver being arranged to receive a plurality of electromagnetic waves transmitted from the plurality of transmitters; and a controller associated with the projectile, the controller being arranged to: determine at least one of a position, a velocity or an acceleration of the projectile from transmission positions of the plurality of transmitters and Doppler measurements derived from the received plurality of electromagnetic waves; and generate a control signal for performing an action with the projectile depending on the determined at least one of position, velocity or acceleration of the projectile.

Suitably, at least one of the plurality of transmitters is arranged to communicate its own transmission position to the projectile either in the transmitted electromagnetic wave or by transmitting another electromagnetic wave, and the projectile is arranged to receive the electromagnetic wave from the at least one of the plurality of transmitters, and extract the transmission position from the received electromagnetic wave. Suitably, at least one of the plurality of transmitters is arranged to be mobile.

Suitably, the control system further comprises a locator arranged to: detect at least one of the plurality of transmitters; determine at least one transmission position of the detected at least one of the plurality of transmitters; encode data for identifying each of the detected at least one transmitter and its determined transmission position on an electromagnetic wave; and transmit that electromagnetic wave to the projectile, wherein the projectile is arranged to:

receive, from the locator, the electromagnetic wave; and retrieve the determined at least one transmission position from the data by decoding data encoded in the received electromagnetic wave.

Suitably, the control system further comprises a ranged weapon arranged to fire the projectile toward a target, and provide target position information to the projectile. Suitably, the projectile is a steerable projectile, and the action comprises adjusting a trajectory of the projectile using the target position information and the determined at least one of position, velocity or acceleration of the projectile. Suitably, the plurality of transmitters are arranged to be positioned so that the transmission positions are dispersed around the trajectory of the projectile. Suitably, at least one transmission position is pre-arranged before the projectile is fired from the ranged weapon so that the pre-arranged at least one transmission position is determinable from data stored in a memory provided in the projectile. Suitably, the action comprises activating a fuze of the projectile using the target position information and the determined at least one of position, velocity or acceleration of the projectile.

Suitably, the control system further comprises a Global Navigation Satellite System GNSS receiver and/or an Inertial Measurement Unit IMU associated with the projectile, wherein the GNSS and/or the IMU is arranged to determine a position or velocity estimate of the projectile, and the controller of the projectile is arranged to determine the at least one of position, velocity or acceleration of the projectile from: the transmission positions; the Doppler measurements derived from the received plurality of electromagnetic waves; and the position estimate determined using the GNSS receiver and/or the IMU, or pseudo-range measurements from the GNSS receiver.

According to a second aspect of the invention, there is provided a projectile comprising a receiver arranged to receive a plurality of electromagnetic waves transmitted from a plurality of transmitters, each transmitter arranged to transmit an electromagnetic wave from a transmission position, and a controller arranged to: determine at least one of a position, a velocity or an acceleration of the projectile from transmission positions of the plurality of transmitters and Doppler measurements derived from the received plurality of electromagnetic waves; and generate a control signal for performing an action with the projectile depending on the determined at least one of position, velocity or acceleration of the projectile.

Suitably, at least one of the plurality of transmitters is arranged to communicate its own transmission position to the projectile either in the transmitted electromagnetic wave or by transmitting another electromagnetic wave, the receiver is arranged to receive the electromagnetic wave from the at least one of the plurality of transmitters, and the controller is arranged to extract the transmission position from the received electromagnetic wave.

Suitably, a locator is arranged to detect at least one of the plurality of transmitters, determine at least one transmission position of the detected at least one of the plurality of transmitters, encode data for identifying each of the detected at least one transmitters and its determined transmission position on an electromagnetic wave, and transmit that electromagnetic wave to the projectile, wherein: the receiver is arranged to receive, from the locator, the electromagnetic wave; and the controller is arranged to retrieve the determined at least one transmission position from the data by decoding data encoded in the received electromagnetic wave.

Suitably, the projectile is arranged to be fired from a ranged weapon toward a target, the ranged weapon is arranged to provide target position information to the projectile, the projectile is a steerable projectile, and the action comprises adjusting a trajectory of the projectile using the target position information and the determined at least one of position, velocity or acceleration of the projectile. Suitably, the projectile further comprises a memory, wherein at least one transmission position is pre-arranged before the projectile is fired from the ranged weapon so that the pre-arranged at least one transmission position is determinable from data stored in the memory provided in the projectile.

Suitably, the action comprises activating a fuze of the projectile using the target position information and the determined at least one of position, velocity or acceleration of the projectile.

Suitably, the projectile further comprises a Global Navigation Satellite System GNSS receiver and/or an Inertial Measurement Unit IMU, wherein the GNSS and/or the IMU is arranged to determine a position or velocity estimate of the projectile, and the controller is arranged to determine the at least one of position, velocity or acceleration of the projectile from: the transmission positions; the Doppler measurements derived from the received plurality of electromagnetic waves; and the position estimate determined using the GNSS receiver and/or the IMU, or pseudo-range measurements from the GNSS receiver.

According to a third aspect of the invention, there is provided a method of controlling a projectile, the method comprising: at each transmitter of a plurality of transmitters, transmitting an electromagnetic wave from a transmission position; and at the projectile, receiving a plurality of electromagnetic waves transmitted from the plurality of transmitters, determining at least one of a position, a velocity or an acceleration of the projectile from transmission positions of the plurality of transmitters and Doppler measurements derived from the received plurality of electromagnetic waves, and generating a control signal for performing an action with the projectile depending on the determined at least one of position, velocity or acceleration of the projectile.

Suitably, the method further comprises: at a locator, detecting at least one of the plurality of transmitters, determining at least one transmission position of the detected at least one of the plurality of transmitters, encoding data for identifying each of the detected at least one transmitters and its determined transmission position on an electromagnetic wave, and transmitting that electromagnetic wave to the projectile; and at the projectile, receiving the electromagnetic wave from the locator, and retrieving the determined at least one transmission position from the data by decoding data encoded in the received electromagnetic wave.

Suitably, the method further comprises: from a ranged weapon, firing the projectile toward a target, and providing target position information to the projectile; and adjusting a trajectory of the projectile using the target position information and the determined at least one of position, velocity or acceleration of the projectile.

Suitably, the method further comprises activating a fuze of the projectile using the target position information and the determined at least one of position, velocity or acceleration of the projectile.

Suitably, the projectile comprises a Global Navigation Satellite System GNSS receiver and/or an Inertial Measurement Unit IMU, and the method further comprises: at the GNSS and/or the IMU, determining a position or velocity estimate of the projectile; and determining the at least one of position, velocity or acceleration of the projectile from: the transmission positions; the Doppler measurements derived from the received plurality of electromagnetic waves; and the position estimate determined using the GNSS receiver and/or the IMU, or pseudo-range measurements from the GNSS receiver.

It will be appreciated by the skilled person, from a reading of this disclosure in combination with the inherent knowledge of the skilled person, that unless clearly mutually exclusive, one or more features of any aspect of the invention might be combined with, and/or replace one or more features of any other aspect of the invention.

For a better understanding of the invention, and to show how embodiments of the same may be carried into effect, reference will now be made, by way of example, to the accompanying diagrammatic Figures in which:

FIG. 1 schematically depicts a control system according to an example embodiment;

FIG. 2A schematically depicts a control system according to an example embodiment;

FIG. 2B schematically depicts a control system according to an example embodiment;

FIG. 3A schematically depicts a ranged weapon for firing a projectile according to an example embodiment;

FIG. 3B schematically depicts principles associated with firing of a projectile from the ranged weapon of FIG. 3A according to an example embodiment;

FIG. 4 schematically depicts a projectile according to an example embodiment, including a receiver and a controller;

FIG. 5 schematically depicts a projectile according to an example embodiment, including a receiver, a controller and an actuator;

FIG. 6 schematically depicts a projectile according to an example embodiment, including a receiver, a controller, an actuator, and a fuze;

FIG. 7 is a flow chart schematically depicting an overview of a method relating to the control system of any one of FIGS. 1 to 2B according to an example embodiment;

FIG. 8 is a flow chart schematically depicting a related method (or method portion) relating to the control system of FIG. 2A according to an example embodiment;

Figure 1:
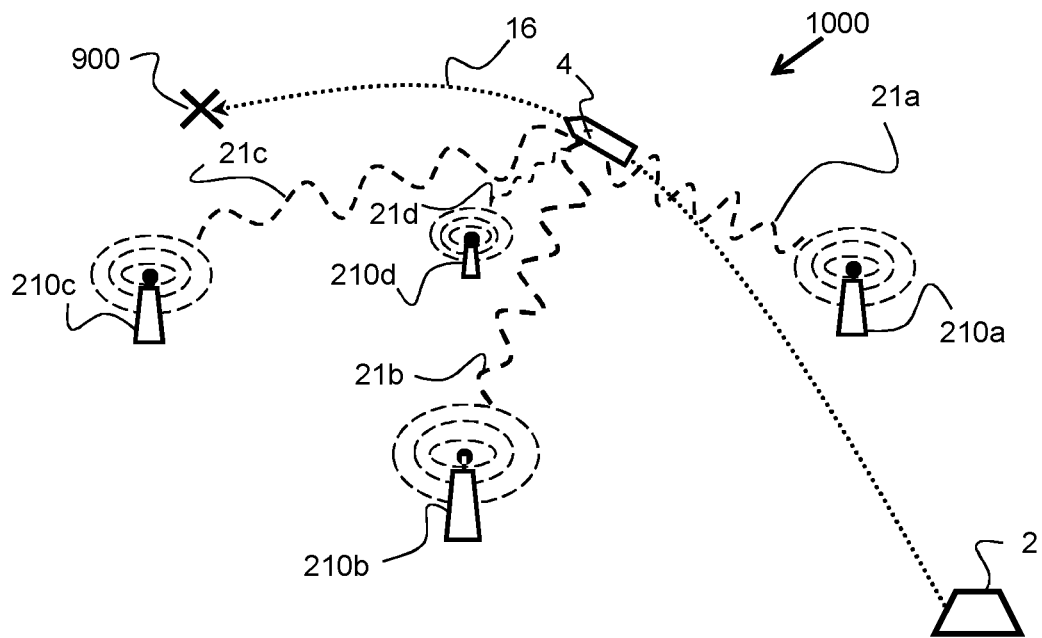

FIG. 1 schematically depicts a control system 1000 according to an example embodiment, wherein the control system 1000 is for controlling a projectile 4 fired from a ranged weapon 2.

The ranged weapon 2 is a tank or a mortar, and the projectile 4 is an artillery shell or a mortar bomb fired therefrom. The ranged weapon 2 provides target position information for determining a target position to the projectile 4. Although this example shows the ranged weapon 2 firing the projectile 4, it is understood that the control system 1000 can be implemented with any other types of projectile 4, even if not fired from a ranged weapon 2, as long as the projectile 4 is provided with the target position information. For example, according to an embodiment, the ranged weapon 2 is a missile launcher or a rocket launcher, and the projectile 4 is a missile or a rocket with its own propulsion system.

The control system 1000 comprises a plurality of transmitters 210a, 210b, 210c, 210d. Each transmitter of the plurality of transmitters 210a, 210b, 210c, 210d transmits an electromagnetic wave 21a, 21b, 21c, 21d from a transmission position, which is the position the relevant transmitter is located at the time when the relevant electromagnetic wave is transmitted. The plurality of transmitters 210a, 210b, 210c, 210d are fixed at respective transmission positions when a plurality of electromagnetic waves 21a, 21b, 21c, 21d are transmitted therefrom. The transmission positions are dispersed around a trajectory 16 of the projectile 4 so that the projectile 4 can receive the plurality of electromagnetic waves 21a, 21b, 21c, 21d. The transmission positions are pre-arranged before the projectile 4 is fired from the ranged weapon 2 and the pre-arranged transmission positions are stored as data in the memory of the projectile 4. This allows the pre-arranged transmission positions to be determined from data stored in the memory provided in the projectile 4.

According to an example embodiment, at least one of the plurality of transmitters 210a, 210b, 210c, 210d, say a positioning enabled transmitter, communicates its own transmission position to the projectile 4 either in the transmitted electromagnetic wave 21a, 21b, 21c, 21d or by transmitting another electromagnetic wave. In this case, the positioning enabled transmitter either comprises, or is capable of communicating with, a position determiner such as a Global Navigation Satellite System GNSS receiver, for determining the positioning enabled transmitter's own transmission position. The projectile 4 then receives the electromagnetic wave from the positioning enabled transmitter, and extracts the transmission position from the received electromagnetic wave. This enables use of transmission positions that are not determinable from data stored in the memory of the projectile 4, for example because the relevant transmitter is mobile and its transmitter position may change over time.

A receiver of the projectile 4 receives the plurality of electromagnetic waves 21a, 21b, 21c, 21d transmitted from the plurality of transmitters 210a, 210b, 210c, 210d, and a controller of the projectile 4 determines at least one of a position, a velocity or an acceleration of the projectile 4 from transmission positions of the plurality of transmitters 210a, 210b, 210c, 210d, and from Doppler measurements derived from the received plurality of electromagnetic waves 21a, 21b, 21c, 21d. As the projectile 4 travels along the trajectory 16 toward the target 900, the controller of the projectile 4 then generates a control signal for performing an action with the projectile 4 depending on the determined at least one of position, velocity or acceleration of the projectile 4.

Each of the plurality of transmitters 210a, 210b, 210c, 210d is assigned an allocated transmission frequency, which is a frequency of the electromagnetic carrier wave at transmission. The controller of the projectile 4 is provided with allocated transmission frequency information so that the controller can derive the Doppler measurements from the received plurality of electromagnetic waves 21a, 21b, 21c, 21d by measuring a frequency shift between the received electromagnetic wave's 21a, 21b, 21c, 21d allocated transmission frequency and its corresponding reception frequency. The reception frequency is a frequency of the received electromagnetic wave 21a, 21b, 21c, 21d on reception, as detected by the receiver of the projectile 4. The allocated frequencies of the plurality of transmitters 210a, 210b, 210c, 210d may be evenly-spaced across an allocated frequency range. The allocated transmission frequency information comprises information for determining each transmitter's 210a, 210b, 210c, 210d allocated transmission frequency. The allocated transmission frequencies are pre-arranged before the projectile 4 is fired from the ranged weapon 2 and the pre-arranged allocated transmission frequencies are stored as data, i.e. the allocated transmission frequency information, in the memory of the projectile 4. This allows the pre-arranged allocated transmission frequencies to be determined from the allocated transmission frequency information.

It is understood that any set of spot frequencies or frequency bands may also be used, provided that a spacing between each pair of allocated transmission frequencies, or transmission frequency ranges, is larger than the maximum expected Doppler excursion with respect to each transmitter. This expected Doppler excursion may be determined prior to using the control system 1000, i.e. during mission planning. It is also understood that according to an embodiment, instead of using just spot frequencies, a Multi-Carrier Modulation (MCM) transmission of the electromagnetic waves 21a, 21b, 21c, 21d may be used, for example using an Orthogonal Frequency Division Multiplex (OFDM) type transmission. Use of such a MCM enables a modulation mechanism for communicating data over the transmitted electromagnetic waves 21a, 21b, 21c, 21d. For example, the modulation mechanism may be used to communicate, to the projectile 4, data relating to at least one of: transmitter identification information for identifying each transmitter, transmitter position information for indicating the transmitter's transmission position, allocated transmission frequency information, or transmitter status information for indicating the transmitter's health status such as whether the transmitter is operational or not. If the allocated transmission frequency information is communicated to the projectile 4 in the electromagnetic wave 21a, 21b, 21c, 21d, the receiver of the projectile 4 is arranged to scan a range of frequencies, identify each electromagnetic wave 21a, 21b, 21c, 21d, and receive the relevant electromagnetic wave 21a, 21b, 21c, 21d so that the allocated transmission frequency information can be decoded from the data carried on the electromagnetic wave 21a, 21b, 21c, 21d.

The control system 1000 enables determination of the at least one of position, velocity or acceleration of the projectile 4 even when other positioning and/or navigation systems such as a Global Navigation Satellite System (GNSS) is not accessible to the projectile 4. This is particularly useful when the trajectory 16 and/or orientation of the projectile 4 is such that reception of any GNSS signal is difficult or restricted. By making this determination based on the Doppler measurements, the projectile 4 can then be controlled to perform the action using the control signal generated based on the determined at least one of position, velocity or acceleration.

According to an example embodiment, the control system 1000 further comprises a Global Navigation Satellite System GNSS receiver and/or an Inertial Measurement Unit IMU associated with the projectile 4. The GNSS receiver and/or the IMU determines a position or a velocity estimate for the projectile 4, and communicates the position or velocity estimate to the controller of the projectile 4. Then, the controller of the projectile 4 determines the at least one of position, velocity or acceleration of the projectile 4 by taking into account of all of: the transmission positions of the plurality of transmitters 210a, 210b, 210c, 201d; Doppler measurements derived from the received plurality of electromagnetic waves; and the position or velocity estimate determined using the GNSS receiver or the IMU. Use of this combination of the Doppler measurement based determination and the GNSS and/or IMU based position or velocity estimate enables a more robust control of the projectile 4 and/or operation of the control system 1000 since the control and/or operation is possible as long as any one of the Doppler measurement based determination and the GNSS and/or IMU based position or velocity estimate is available. It is understood that the GNSS receiver may provide to the controller a pseudo-range measurement rather than the actual position or velocity estimate value. These pseudo-range measurements are then used, by the controller, in a navigation filter to derive a position or velocity estimate.

Further, the control system 1000 being provided with the GNSS receiver and/or IMU to make use of this position or velocity estimate enables a more accurate determination of the at least one of position, velocity or acceleration of the projectile 4 as it travels along its trajectory 16. This is because any errors from the GNSS receiver and/or the IMU may be corrected or reduced based on the derived Doppler measurements, and vice versa. Because the projectile 4 typically spins at high revolution and travels at very high speeds, the GNSS receiver is more likely to suffer from intermittent reception than the control system 1000 according to the embodiment of the present invention. Moreover, since GNSS is a well-known system it may be subject to malicious denial through jamming or spoofing. By contrast, the control system 1000 can more easily employ diverse and covert waveforms to prevent such denial.

According to an example embodiment, the controller of the projectile 4 also corrects the derived Doppler measurements to compensate for projectile spin before determining the at least one of a position, a velocity or an acceleration of the projectile. Then the compensated at least one of a position, a velocity or an acceleration is determined from the transmission positions of the plurality of transmitters and the corrected Doppler measurements. This correction is achieved by applying weighting to each Doppler measurement based on the measured Doppler spectrum's spread across a predetermined time period. This correction further improves the accuracy of the determined at least one of position, velocity or acceleration.

A control module may also be provided inside the projectile 4 to house the controller and the receiver. The control module is constructed by stacking a plurality of Printed Circuit Boards (PCBs) in a single stack. This allows the control module to be easily constructed and fit inside a narrow body of the projectile 4. For example, the stack of PCBs may contain a Radio Frequency down-conversion stage, a Doppler measurement extraction stage and a navigation filter processor. The navigation filter processor processes the received electromagnetic waves from the plurality of transmitters 210a, 210b, 210c, 210d in order to determine at least one of position, velocity or acceleration of the projectile 4.

According to an example embodiment, the projectile 4 is a steerable projectile, and the action performed by the control signal adjusts the trajectory 16 of the projectile 4 using the target position information and the determined at least one of position, velocity or acceleration of the projectile 4. This adjustment of trajectory 16 can be achieved using a number of different ways. For example, by controlling a canard provided on a surface of the projectile 4 and/or by controlling a propulsion system designed to change a travel direction of the projectile 4. In the former example, the projectile 4 may comprise an actuator that operates a canard provided on the projectile 4, and the control signal controls the actuator. In the latter example, the projectile 4 may comprise a propulsion system that is capable of adjusting the trajectory 16 of the projectile 4, and the control signal controls a thrust output, or propulsion, from the propulsion system. By adjusting the trajectory 16, the control system 1000 enables an improved accuracy for the projectile 4 to hit, or reach nearby, the target 900 as appropriate.

According to an example embodiment, the projectile 4 also comprises a pay-load such as an explosive, and the action comprises activating a fuze for detonating the pay-load of the projectile 4 using the target position information and the determined at least one of position, velocity or acceleration of the projectile 4. By doing this, the control system 1000 enables an activation of the fuze to take place at an optimal position for causing maximum damage at, near or to the target 900.

It is understood that the control system 1000 can work with any type of projectile 4 that can make use of at least one of position, velocity or acceleration to perform any other type of action based thereon.

It is also understood that the control system 1000 can determine any subset of position, velocity and acceleration of the projectile so that appropriate control signal for performing an action can be generated based thereon. For example, according to an example embodiment wherein the control system 1000 replaces a GNSS and/or an IMU based system, or works in conjunction therewith, the control system 1000 determines a position, or a position and a velocity, of the projectile so that the control system 1000 works with other components designed to be compatible with the GNSS or the IMU.

According to an example embodiment, the control system 1000 forms a part of a munition platform, the receiver and the controller of the projectile 4 form parts of a navigation receiver on the munition platform, and the plurality of transmitters 210a, 210b, 210c, 210d act as beacons placed at known or determinable locations on the ground. In one embodiment the beacon locations (i.e. the transmitter positions) and/or transmission positions are pre-surveyed and/or pre-arranged, and then transmitted to an artillery battery prior to first use. Allocated transmission frequency information is also obtained, and communicated to the artillery battery and/or the projectile 4 so that each projectile 4, i.e. munition, is programmed with the beacon locations and/or transmission positions, and allocated transmission frequencies of the plurality of transmitters 210a, 210b, 210c, 210d. The controller of the projectile 4 determines at least one of a position, a velocity or an acceleration of the projectile 4 from: the transmitter positions (i.e. beacon locations), or the transmission positions, of the plurality of transmitters 210a, 210b, 210c, 210d; and radial velocity measurements (i.e. Doppler measurement) derived from the received plurality of electromagnetic waves 21a, 21b, 21c, 21d (i.e. beacon signals) by comparing an allocated transmission frequency with a corresponding reception frequency.

According to an embodiment, the controller also extracts carrier-phase measurement from each electromagnetic wave 21a, 21b, 21c, 21d (i.e. each beacon signal) that is received. The carrier-phase measurement is a measure of a range between the corresponding beacon and the receiver of the projectile 4 in units of cycles of the carrier frequency. So the carrier-phase measurement can further provide range data (based on a time-of-arrival principle) that can be used in combination with the transmitter positions (i.e. the beacon locations), or the transmission positions, of the plurality of transmitters 210a, 210b, 210c, 210d, and radial velocity measurements (i.e. Doppler measurement) derived from the received plurality of electromagnetic waves 21a, 21b, 21c, 21d (i.e. beacon signals) to determine the at least one of position, velocity or acceleration of the projectile 4. This measurement step comprises an instantaneous wideband measurement capture of all beacon signals, followed by frequency analysis, and an iterated peak detection and data extraction over all received beacon signals. An on-board real-time clock provides the necessary time-stamping of data and control of the sample rate of the receiver. A Doppler shift in each beacon signal is then obtained from a weighted combination of Doppler peak measurements from a frequency analysis of the received signals. According to an example embodiment with three Doppler measurements and an example weighting, the Doppler shift is calculated using Eq 1 below:

$$\hat{f} = \frac{(f_{peak}-1)\cdot|S(f_{peak}-1)| + f_{peak}\cdot|S(f_{peak})| + (f_{peak}+1)\cdot|S(f_{peak}+1)|}{|S(f_{peak}-1)| + |S(f_{peak})| + |S(f_{peak}+1)|} \quad (Eq\ 1)$$

where f are the identified frequencies and S(f) are the corresponding complex frequency spectrum values.

According to an example embodiment, the Doppler measurements are also corrected, i.e. compensated, for a projectile spin. This is achieved by performing a constrained weighted sum calculation of a power spectrum of the received signal localised around each beacon signal, the calculation being performed on the power spectrum observed over a selectable dwell period. An example spin compensation formula is as follows:

$$\hat{f} = \frac{\sum_{k;|S(f_k)|^2 > \alpha\cdot max_j(|S(f_j)|^2)} f_k \cdot |S(f_k)|^2}{\sum_{k;|S(f_k)|^2 > \alpha\cdot max_j(|S(f_j)|^2)} |S(f_k)|^2} \quad (Eq\ 2)$$

Where $\alpha$ ($\leq 1$) is a threshold parameter, adapted to the noise floor level in the frequency spectrum.

The dwell period is selected to optimise the accuracy of the correction/compensation, whilst taking into account of limited computational resources available for performing the correction/compensation. This correction/compensation step provides a corrected/compensated Doppler measurement for each beacon signal.

Then, according to an example embodiment, the determination step of determining the at least one of position, velocity or acceleration of the projectile 4 comprises a navigation processing step. The navigation processing step comprises use of an Extended Kalman Filter (EKF) tracking a 3D position, 3D velocity and 3D acceleration states, as well as a local clock offset and a frequency offset corresponding to each beacon signal. So an example state vector comprises the following:

$$\hat{x} = (x\ \dot{x}\ \ddot{x}\ y\ \dot{y}\ \ddot{y}\ z\ \dot{z}\ \ddot{z}\ \epsilon\ f_{b1}\ f_{b2}\ \ldots\ f_{bn})^T \quad (Eq\ 3)$$

where $\hat{x}$ is the state vector, (x, y, z) is a 3D position vector, ($\dot{x}, \dot{y}, \dot{z}$) is a 3D velocity vector which is a first derivative of the 3D position vector, ($\ddot{x}, \ddot{y}, \ddot{z}$) is a 3D acceleration vector which is a second derivative of the 3D position vector, $\epsilon$ is a local clock offset, and ($f_{b1}, f_{b2}, \ldots, f_{bn}$) is a frequency offset vector for n beacons.

The EKF may use a suitable motion model, for example a correlated acceleration motion model for the position, velocity and acceleration (PVA) states, as follows:

A state transition matrix F may be defined with the following block-diagonal form for the PVA states:

$$\tilde{F} = \begin{pmatrix} A & 0 & 0 \\ 0 & A & 0 \\ 0 & 0 & A \end{pmatrix} \quad \text{(Eq 4)}$$

Where the sub-matrix A is:

$$A = \begin{pmatrix} 1 & dt & \frac{\rho_m + \beta \cdot dt - 1}{\beta^2} \\ 0 & 1 & \frac{1 - \rho_m}{\beta} \\ 0 & 0 & \rho_m \end{pmatrix}; \quad \text{(Eq 5)}$$

$\rho_m = e^{-dt \cdot \beta}$ is a manoeuvre correlation coefficient;

$\beta$ is a reciprocal of a manoeuvre correlation time constant, which is tuned for the munition platform as appropriate; and dt is a measurement epoch interval.

Similarly, a plant noise matrix Q may be defined with the following form for the PVA states:

$$Q = \begin{pmatrix} B & 0 & 0 \\ 0 & B & 0 \\ 0 & 0 & B \end{pmatrix} \quad \text{(Eq 6)}$$

where the sub-matrix B is:

$$B = q_0 \cdot \begin{pmatrix} \frac{dt^5}{20} & \frac{dt^4}{8} & \frac{dt^3}{6} \\ \frac{dt^4}{8} & \frac{dt^3}{3} & \frac{dt^2}{2} \\ \frac{dt^3}{6} & \frac{dt^2}{2} & dt \end{pmatrix} \quad \text{(Eq 7)}$$

and $q_0 = 2 \cdot \sigma_m^2 \cdot \beta$, and $\sigma_m^2$ is a manoeuvre variance (m²)

For the clock state 6 and the frequency offset states $f_{bi}$ suitable polynomial drift models for the state transition and appropriate plant noise model components are used.

At an EKF initialisation step, which is performed over a plurality of measurement epoch intervals, the state vector $\hat{x}$, the state transition matrix F, and the plant noise matrix Q are initialised. According to an embodiment, a 3 degree-of-freedom or a 6 degree-of-freedom projectile trajectory model or a simplified ballistic model is used for this initialisation step. It is understood that any type of projectile trajectory model and/or ballistic model may be used for this initialisation step as long as the parameters modelled therein corresponds with a state representable using the state vector $\hat{x}$, the state transition matrix F, and the plant noise matrix Q.

An observation matrix H implemented in the EKF has the following form for each transmitter (beacon):

$$H = \left( |\tilde{r}| \cdot \hat{x} - \frac{\tilde{r} \cdot \tilde{v}}{|\tilde{r}|} \cdot \frac{\tilde{r}_1}{|\tilde{r}|^2}, \frac{\tilde{r}_1}{|\tilde{r}|}, 0 \; |\tilde{r}| \cdot \hat{y} - \frac{\tilde{r} \cdot \tilde{v}}{|\tilde{r}|} \cdot \frac{\tilde{r}_2}{|\tilde{r}|^2}, \frac{\tilde{r}_2}{|\tilde{r}|}, \right. \quad \text{(Eq 8)}$$

$$\left. 0 \; |\tilde{r}| \cdot \hat{z} - \frac{\tilde{r} \cdot \tilde{v}}{|\tilde{r}|} \cdot \frac{\tilde{r}_3}{|\tilde{r}|^2}, \frac{\tilde{r}_3}{|\tilde{r}|}, 0 \; 1 \; 0 \; \ldots \; 1 \; 0 \right)$$

where $\tilde{r}$ is a Light-Of-Sight (LOS) vector from a current state estimate of the projectile position to a corresponding beacon, and $\tilde{v}$ is a current 3D state estimate of a munition (i.e. projectile) velocity. The clock offset and the relevant frequency offset states are also included, assuming a simple drift model for each, but it is understood that this need not be the case depending on the implementation details of the embodiment. It is also understood that more complicated polynomial drift models may be incorporated as appropriate. Using the EKF with a plurality of observations, with each row of the observation matrix H for each beacon (i.e. each one of the plurality of transmitters 210a, 210b, 210c, 210d from which the electromagnetic waves 21a, 21b, 21c, 21d are received), the state vector $\hat{x}$ of the projectile can be solved, i.e. the at least one of position, velocity or acceleration of the projectile 4 is determined.

According to an example embodiment, the control system 1000 further comprises a system planning tool such as an optimiser comprising a simulation module for simulating a projectile control scenario based on a predetermined degree of freedom projectile trajectory model, for example the 3 degree-of-freedom or the 6 degree-of-freedom munition (i.e. projectile) trajectory model or a simplified ballistic model described above. The simulation module uses a predicted range to a target 900 and/or a predicted target position of the target 900, a projectile type, predicted initial launch conditions, such as wind conditions, when the projectile 4 is expected to be launched and/or fired, and a Doppler measurement sampling rate to run the projectile control scenario simulation.

By repeatedly running the simulation whilst varying a simulation parameter, for example a number of transmitters and/or transmission positions thereof used with the control system 1000, the optimiser determines an optimised number of transmitters and/or their optimised transmission positions for a given target 900 or a given target position. It is understood that the optimised parameters are the minimum parameter values that give an acceptable accuracy for the projectile 4 hitting or reaching near the given target 900, whilst using as little resources as possible. For example, an optimised number of transmitters would be the minimum number of transmitters that is able to still achieve the acceptable accuracy. Optimised transmission positions would be potential transmitter sites or areas for the transmission positions that can still achieve the acceptable accuracy using a given number of transmitters that are available. It is understood that the same simulation can also be performed using, as the given target 900, a general area where a target is likely to be present. The control system 1000 then uses the determined optimised number of transmitters when the projectile 4 is launched/fired and/or at least some of the plurality of transmitters are positioned at their respective optimised transmission positions.

For example, a projectile control scenario for a typical artillery shell launched at a certain speed at a certain angle can be simulated using the 3 degree-of-freedom or the 6 degree-of-freedom projectile trajectory model or a simplified ballistic model described above. In the simulation, the predicted range to an intended target can be set to an approximated distance from the launch site, whilst neglecting wind effects. A predetermined number of transmitters are simulated to be placed on a ground in an optimised fashion, operating at a nominal Radio Frequency. The simulation is run with a measurement step consistent with a predetermined frequency resolution, a predetermined measurement update/sampling rate, and a predetermined signal-to-noise ratio at the electromagnetic wave reception/detection stage.

The predetermined frequency resolution, the predetermined measurement update/sampling rate, and the predetermined signal-to-noise ratio are selected so that an error in the measurement step remains within an acceptable level. For example, the predetermined signal-to-noise ratio of 10 dB is used to achieve a Cramer-Rao lower bound Doppler measurement error of approximately 4 m/s. According to an example embodiment, one hundred Monte-Carlo simulation runs produced a distribution of terminal point solutions which showed a sufficiently good performance, i.e. the projectile being steered so that it terminates at a position within an acceptable distance away from the intended target. The simulated control system achieved all terminal positions at less than 0.02% of the predicted range to the intended target. The simulated control system was shown to achieve this same accuracy performance with as little as three transmitters positioned at optimised transmission positions. When simulated with an error of up to 10 m standard deviation for each transmission position, the accuracy performance of the simulated control system was reduced but all terminal positions still remained within approximately 100 m from the position of intended target, which is still a respectable accuracy performance for the predicted range, which is likely to be tens or hundreds of kilometres. Based on this simulation, the optimiser of the control system 1000 determines that at least three transmitters at or near the determined optimised transmission positions (within 10 m from each determined optimised transmission position) are sufficient for the intended target, and the control system 1000 either positions or identifies at least three transmitters at or for the determined optimised transmission positions before the projectile 4 is launched/fired toward a target 900.

Figure 2A:
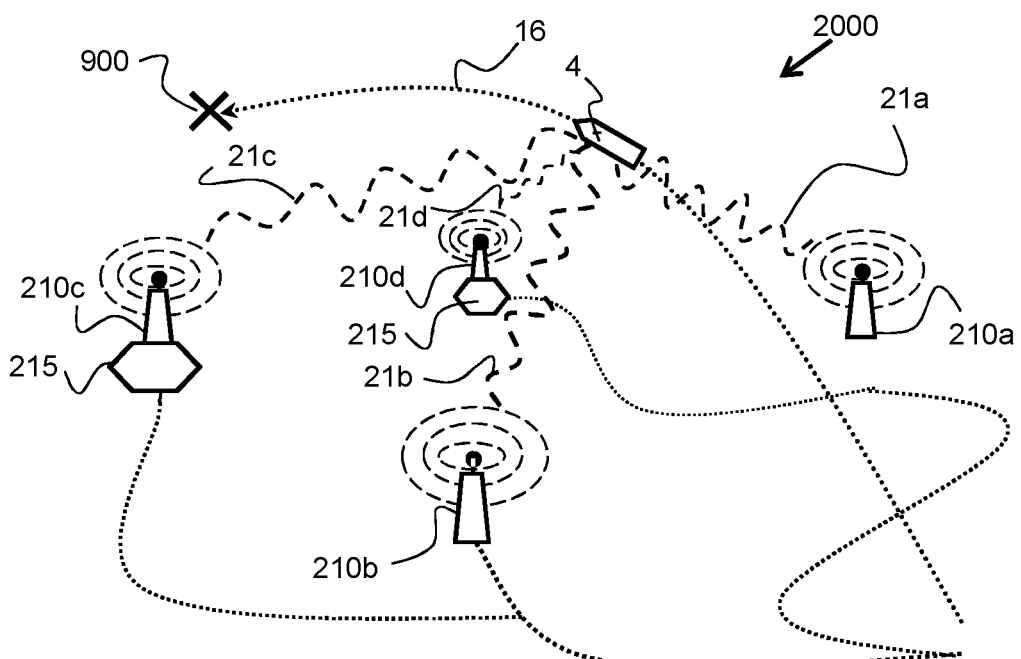

FIG. 2A schematically depicts a control system 2000 according to another example embodiment, wherein the difference from the control system 1000 of FIG. 1 is that at least one of the plurality of transmitters 210a, 210b, 210c, 210d is mobile. An immobile first transmitter 210a is fixed at its first transmission position, and remains stationary, on the ground or in the air, as its electromagnetic wave 21a is transmitted. A mobile second transmitter 210b is capable of moving on its own. For example, the second transmitter 210b may comprise its own propulsion system for movement. The second transmitter 210b moves to its second transmission position, and can either be stationary or in motion, on the ground or in the air, at the second transmission position as its electromagnetic wave 21b is transmitted.

A mobile third transmitter 210c and a mobile fourth transmitter 210d are carried around by transmitter vehicles 215. The transmitter vehicle 215 moves the third or fourth transmitters 210c, 210d to its respective third or fourth transmission position. The third or fourth transmitter 210c, 210d may be dismounted from the transmitter vehicle 215, and be stationary at the third or fourth transmission position as its electromagnetic wave 21c, 21d is transmitted. If the third or fourth transmitter 210c, 210d remains on the transmitter vehicle 215, the third or fourth transmitter 210c, 210d can either be stationary or in motion, on the ground or in the air, at the third or fourth transmission position as its electromagnetic wave 21c, 21d is transmitted. It is understood that, as discussed in relation to control system 1000 in FIG. 1, the transmission positions may be pre-arranged before the projectile 4 is fired and stored as data in a memory of the projectile 4, and/or at least one of the plurality of transmitters 210a, 210b, 210c, 210d, say a positioning enabled transmitter, may communicate its own transmission position to the projectile 4 either in the transmitted electromagnetic wave 21a, 21b, 21c, 21d or by transmitting another electromagnetic wave. For a case where the transmission of the electromagnetic wave happens when the relevant transmitter, i.e. one of the second, third or fourth transmitter 210b, 210c, 210d, is in motion, it is preferable that the relevant transmitter is a positioning enabled transmitter. This is because then the positioning enabled transmitter can determine its position by itself, and transmit the electromagnetic wave with this information as it passes the relevant transmission position. The transmission position may still be one of the pre-arranged transmission positions stored in the memory of the projectile 4, and/or may be a new transmission position communicated to the projectile 4 by the positioning enabled transmitter.

According to an embodiment, the transmitter vehicle 215 or the second transmitter 210b is another projectile, an airship, and/or an unmanned aerial vehicle (UAV). It is understood that any vehicle capable of moving whilst carrying a transmitter, for example a terrestrial or marine vehicle, may be used as the transmitter vehicle 215 or the second transmitter 210b. It is also understood that the transmitter vehicle 215 or the second transmitter 210b may comprise its own propulsion system to give this mobility. The mobility of the second, third or fourth transmitter 210b, 210c, 210d enables the control system 2000 to have a scalable, adaptive and efficient configuration for the transmission positions. For example, once a target position of the target 900 is known, the control system 2000 can move the mobile transmitters so that the transmission positions are dispersed optimally around a projected trajectory 16 of the projectile 4 for travelling towards the target 900. This will, then in turn, improve the accuracy and effectiveness of control system 2000 as it controls the projectile 4.

It is understood that according to another embodiment, all of the plurality of transmitters 210a, 210b, 210c, 210d are positioning enabled transmitters that are also mobile.

Figure 2B:
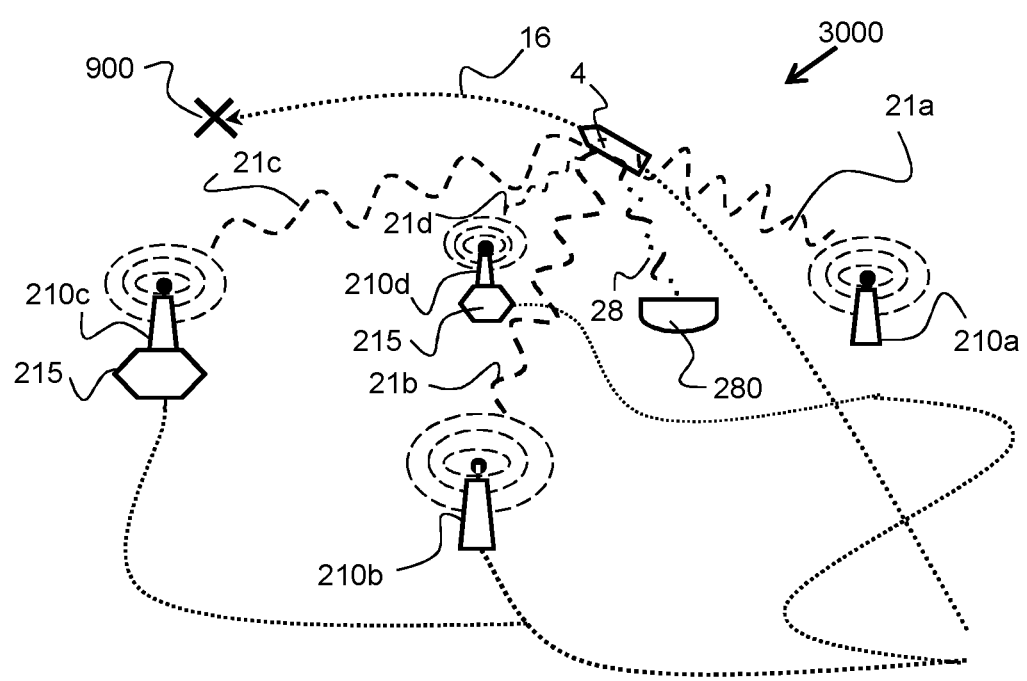

FIG. 2B schematically depicts a control system 3000 according to another example embodiment, wherein the difference from the control system 2000 of FIG. 2A is that a locator 280 is used to inform the projectile 4 of at least one transmission position. It is understood that a control system 1000 of FIG. 1 may also be implemented with such a locator 280 as described herein.

The control system 3000 comprises a locator 280 capable of: detecting a presence of a transmitter; detecting the transmitter's transmission position; and communicating, to the projectile 4, an identification and a transmission position of the detected transmitter. According to an embodiment, the locator 280 may comprise an external scanner capable of scanning for a presence of a transmitter and the present transmitter's transmission position.

The locator 280 detects the presence and a transmission position of at least one transmitter that is nearby, say a first transmitter 210a. It is understood that a number of different ways may be used for this detection, for example by receiving and decoding data included in an electromagnetic wave from the first transmitter 210a, by detecting a signature of a transmitter, by scanning for a transmitter using a radar system, and so on. The locator 280 then identifies the first transmitter 210a and its transmission position. If the first transmitter 210a is not capable of communicating its own transmission position to the locator 280, for example if the first transmitter 210a is not a positioning enabled transmitter, the locator 280 comprises a transmitter position determiner for determining the transmission position of the first transmitter 210a based on a map data and/or the locator 280's own position from a GNSS receiver or from other trilateration or triangulation techniques, such as angle-ofarrival, or ranging technique. For example, a transmitter position can be determined by a locator, or a network of locators, based on an intersection of estimated bearing of the transmitters at different observation points (triangulation), on time-of-arrival of a known transmission at a known time, on time-difference of arrival of a transmitter by moving the locator around the transmitter, or from a network of locators.

Once the identification and the transmission position has been determined/identified, the locator 280 encodes data for identifying the first transmitter 210a and its determined transmission position on an electromagnetic wave 28, and transmit that electromagnetic wave 28 to the projectile 4. The projectile 4 then receives, from the locator 280, the electromagnetic wave 28 and retrieves the determined transmission position of the first transmitter 210a from the data by decoding data encoded in the received electromagnetic wave 28. As the locator 280 provides information on the transmission position of the first transmitter 210a, the projectile 4 does not need to retrieve this information from an electromagnetic wave 21a transmitted from the first transmitter 210a or from a memory. Further, when a plurality of transmitters are detected by the locator 280 as described above, the locator 280 can be used to ensure the plurality of transmitters are positioned as intended. For example, if the target 900 is known, the locator 280 may be used to position mobile transmitters so that their transmission positions are dispersed around a projected trajectory 16 of the projectile 4 for travelling towards the target 900. Or the locator 280 may be used to position mobile transmitters so that their transmission positions are at or near optimised transmission positions for the intended target 900. Or the transmitters may communicate with each other to derive relative ranging to each transmitter, which become absolute positions if the first transmitter has its position defined by any of the above techniques.

The locator 280 may be a mobile locator or a stationary locator. Preferably the locator 280 is mobile so that it can cover more ground when performing the transmitter detection step. As a mobile locator 280, or a network of a plurality of locators, travels around an area, the mobile locator 280 detects the presence of at least one of a plurality of transmitters, say a first transmitter 210a, and also either receives or determines the transmission position of the first transmitter 210a as described above. This mobility of the locator 280 means it offers more robust, adaptive and effective way of identifying or determining the transmitter identification and transmission position, whereby the transmitter identification and its transmission position are communicated to the projectile 4 in an efficient manner.

Further, when only a subset of the plurality of transmitters are required for controlling a projectile 4 intended for a target 900, for example an optimised number of transmitters is determined from the optimiser, the mobile locator 280 can first travel along a nearby trajectory to the projected trajectory 16 of the projectile 4, which will be fired later, and identify the most suitable subset of at least one transmitters for that target 900, for example at least the optimised number of transmitters. The mobile locator 280 can then communicate the identification and/or transmission positions of this subset to the projectile 4, which ensures the transmitters used for that particular target 900 and projectile 4 are dispersed around the projected trajectory 16.

According to an embodiment, the mobile locator itself is a vehicle capable of moving to a different position. According to another embodiment, the mobile locator is carried around by a locator vehicle. The mobile locator or the locator vehicle may be another projectile, an airship, and/or an unmanned aerial vehicle (UAV). It is understood that any vehicle capable of moving whilst carrying a locator, for example a terrestrial or marine vehicle, may be used as the mobile locator or the locator vehicle.

Figure 3A:
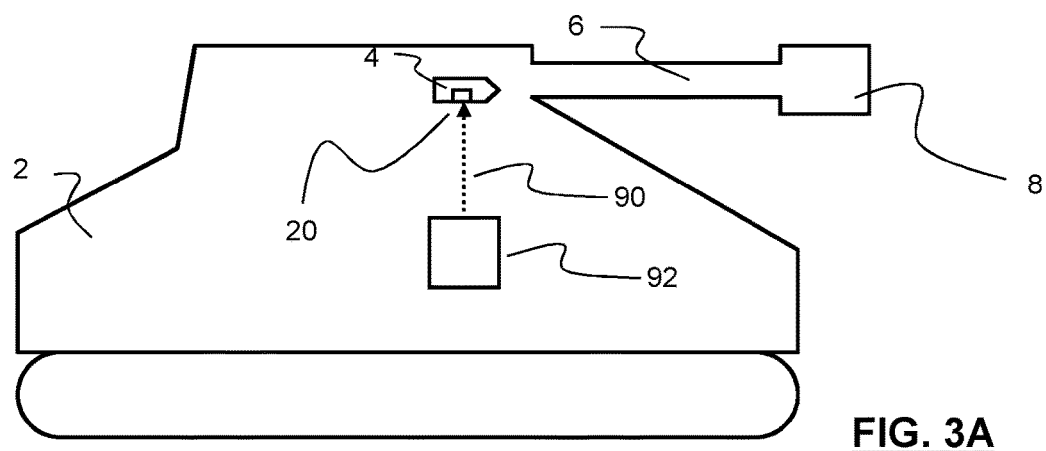

FIG. 3A schematically depicts a ranged weapon 2 for firing a projectile 4 over a distance according to an example embodiment, wherein an interface 92 of the ranged weapon 2 communicates target data 90 comprising target position information to a receiver 20 of the projectile 4. The ranged weapon 2 in FIG. 3A is loosely depicted as a tank, but of course could take one of a number of different forms, for example artillery, self-propelled artillery, a gun battery, a mortar, and so on. The ranged weapon 2 could be fixed in position. The projectile 4 will typically be fired along a barrel 6 before leaving a muzzle 8 of the ranged weapon 2. The target data 90 can be communicated through the interface 92 using either wired and/or wireless communication before the projectile 4 is fired. If wireless communication is used, the target data 90 may also be communicated after the projectile 4 has been fired. For example, the target data 90 may be transferred from the interface 92 or other system of the ranged weapon 2, to the receiver 20 or a storage memory or other system of the projectile 4. The target data 90 might be transferred by inductive coupling, or via electrical contacts or similar.

It is understood that in some instances, the transfer of target data 90 in the manner shown in FIG. 3A may be sufficient in terms of data transfer rate, the nature of data that is transferred, and how the data is transferred. However, in some instances it may not be possible or practical to transfer important up-to-date target data 90 to the projectile 4 immediately before firing, or perhaps more importantly and in certain scenarios, after firing. Such up-to-date information, for example, might be used to take into account variables that might have changed from the time at which the projectile 4 was stored, and target data 90 could have been transferred to the projectile 4 as shown in FIG. 3A, and a time at which the projectile 4 is ready to be fired, during the firing and perhaps even after the firing. So according to an example embodiment, the ranged weapon 2 transmits, or has a transmitter capable of transmitting, data from the ranged weapon 2 to the projectile 4 during the firing process, or even after the firing process when the projectile 4 would have left the ranged weapon 2. One approach might be to use a wireless network to achieve such data transfer—i.e. Wi-Fi or similar. However, the speed at which a projectile 4 might be fired might be such that it would be extremely difficult if not impossible to use Wi-Fi like networking, which has a limited range and requires lengthy initialisation process, to transfer target data to the projectile 4. Thus, in accordance with an example embodiment, an electromagnetic carrier wave is encoded with data comprising target data, and the carrier wave is transmitted to the projectile 4. The carrier wave can be generated, transmitted, received and decoded using a relatively simple technology that is reliable, cheap and extremely efficient in terms of speed of data processing. This allows the target data to be transferred to, and processed by, the projectile 4 even after firing of the projectile 4.

It is understood that according to an example embodiment, the interface 92 may receive target data from an external target locator capable of determining the target position information, and communicating the target position information to the interface 92.

The ranged weapon 2 also comprises an actuator for firing the projectile 4 toward a target. According to an embodiment, the actuator comprises a mechanical trigger or a generator for generating a control signal which is used to fire the projectile 4.

Figure 3B:
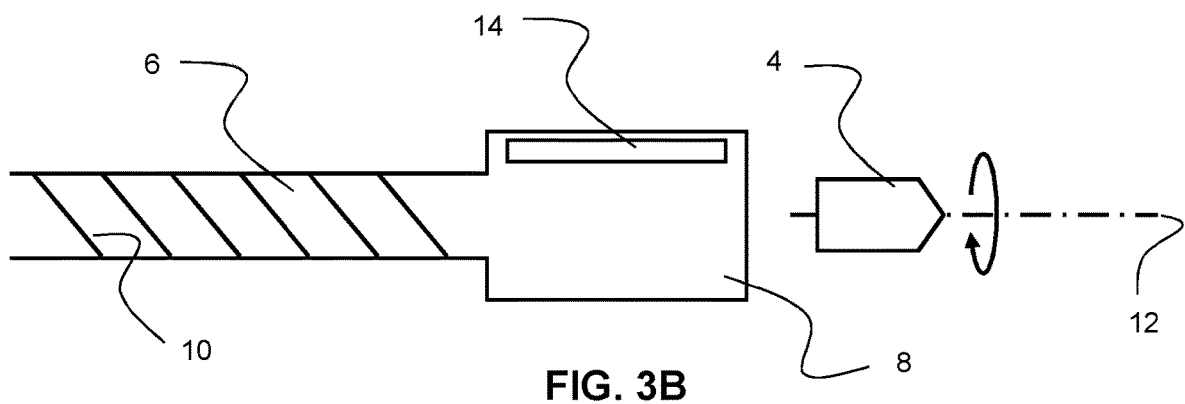

FIG. 3B schematically depicts principles associated with firing of a projectile 4 from the ranged weapon 2 of FIG. 3A according to an example embodiment. The ranged weapon 2 comprises a barrel 6 which is internally rifled 10 to encourage rotation of the projectile 4 about its longitudinal axis 12. The rotation, i.e. the projectile spin, improves aerodynamic stability of the projectile 4 during its subsequent flight trajectory.

The velocity of the projectile 4 upon leaving the muzzle 8 of the ranged weapon can be useful in ranging, and in particular in accurate ranging of the projectile 4 and thus accurate targeting of objects. Muzzle velocity of the projectile 4 may be known or assumed in advance, for example from previous field trials, or calibrations, or modelling, or similar. Alternatively and/or additionally, the ranged weapon 2 might include a muzzle velocity sensor 14 for determining the speed of the projectile 4 as it leaves the muzzle 8, i.e. its initial launch speed. According to an embodiment, this determined speed could be used in firing of later projectiles, where for example the sensor 14 may be used to improve the accuracy of ranging of the projectile by feeding determined speeds into the control system of any one of FIGS. 1 to 2B and/or a fire control or targeting system for firing of that later projectile. The muzzle velocity sensor 14 may take any particular form, and for example might be inertial, electromagnetic, capacitive, magnetic, Radio Frequency, or any other type of sensor which is capable of determining the speed of the projectile 4 at or immediately after the projectile 4 leaves the muzzle 8.

Figure 4:
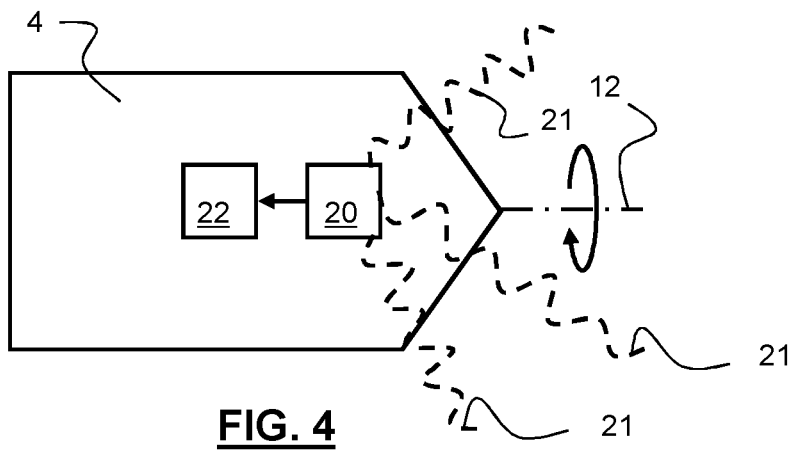

FIG. 4 schematically depicts a projectile 4 according to an example embodiment, wherein the projectile 4 comprises a receiver 20 and a controller 22. As described in relation to the ranged weapon 2 of FIG. 3A or 3B, the projectile 4 is fired from the ranged weapon 2 toward a target, and the ranged weapon 2 provides target position information to the projectile 4. The projectile 4 may comprise a memory for storing the target position information. The memory may also store at least one transmission position (and/or at least one allocated transmission frequency or at least one transmitter identification information) of at least one transmitter so that the at least one transmission position (and/or at least one allocated transmission frequency or at least one transmitter identity) is determinable from data stored in the memory provided in the projectile 4. The receiver 20 receives a plurality of electromagnetic waves 21 transmitted from a plurality of transmitters 210a, 210b, 210c, 210d, wherein each transmitter transmits an electromagnetic wave from a transmission position as described above in relation to the control system 1000, 2000, 3000 of any one of FIGS. 1-2B. The controller 22 then determines at least one of a position, a velocity or an acceleration of the projectile 4 from transmission positions of the plurality of transmitters 210a, 210b, 210c, 210d, and from Doppler measurements derived from the received plurality of electromagnetic waves 21, and generates a control signal for performing an action with the projectile 4. The timing of performing the action depends on the determined at least one of position, velocity or acceleration of the projectile 4. For example, the action is performed when a predetermined condition is satisfied by the determined at least one of position, velocity or acceleration of the projectile 4. According to an embodiment, if the determined magnitude of acceleration is above a certain threshold, the projectile 4 determines that it is either being launched and/or fired, or is impacting a target position, and uses the control signal to either initiate a countdown for activating a fuze, or to activate the fuze. According to another embodiment, if the determined position is not on an intended trajectory path for getting near, or hitting, a target, the control signal is used to steer the projectile 4 so that its actual trajectory better approximates the intended trajectory path. Further, if the determined position is approaching and/or at the target position, the projectile 4 uses the control signal to initiate a countdown for activating a fuze, activate the fuze and/or release a pay-load towards the target.

According to an embodiment, at least one of the plurality of transmitters 210a, 210b, 210c, 210d communicates its own transmission position (and/or own allocated transmission frequency or own transmitter identification information) to the projectile 4 either in the transmitted electromagnetic wave 21 or by transmitting another separate electromagnetic wave, and the receiver 20 receives the electromagnetic wave from the at least one of the plurality of transmitters 210a, 210b, 210c, 210d. The receiver 20 communicates the received electromagnetic wave to the controller 22, and the controller 22 extracts the transmission position (and/or the allocated transmission frequency or the transmitter identification information) from the received electromagnetic wave. As described above in relation to the control system 3000 of FIG. 2B, according to yet another embodiment, a locator 280 detects at least one of the plurality of transmitters 210a, 210b, 210c, 210d, determines at least one transmission position of the at least one of the plurality of transmitters 210a, 210b, 210c, 210d, encodes data for identifying each of the at least one transmitters 210a, 210b, 210c, 210d and its determined transmission position on an electromagnetic wave and transmits that electromagnetic wave to the projectile 4. The receiver 20 then receives, from the locator 280, the electromagnetic wave, and the controller 22 retrieves the determined at least one transmission position from the data by decoding data encoded in the received electromagnetic wave.

According to yet another embodiment, as described above in relation to the control system 1000 of FIG. 1, the projectile 4 further comprises a Global Navigation Satellite System (GNSS) receiver and/or an Inertial Measurement Unit (IMU), which determines a position or velocity estimate of the projectile 4. Then, the controller 22 of the projectile 4 determines the at least one of position, velocity or acceleration of the projectile 4 by taking into account of all of: the transmission positions of the plurality of transmitters 210a, 210b, 210c, 201d; Doppler measurements derived from the received plurality of electromagnetic waves 21; and the position or velocity estimate determined using the GNSS receiver and/or the IMU.

According to an example embodiment, as described above in relation to the control system 1000 of FIG. 1, the controller 22 of the projectile 4 also further corrects the derived Doppler measurements to compensate for a projectile spin about an axis 12 to determine the at least one of a position, a velocity or an acceleration of the projectile from the transmission positions of the plurality of transmitters 210a, 210b, 210c, 201d and the corrected Doppler measurements.

Figure 5:
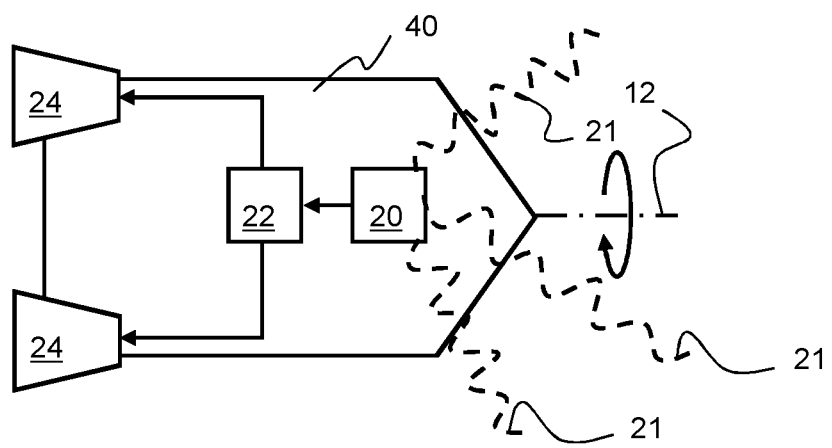

FIG. 5 schematically depicts a projectile 40 according to an example embodiment, wherein the difference from the projectile 4 of FIG. 4 is that the projectile 40 further comprises an actuator 24. The projectile 40 is a steerable projectile, and the actuator 24 actuates a steering unit, such as a canard provided on a surface of the projectile 40, and the control signal generated by the controller 22 is for controlling the actuator 24. The actuator changing the orientation of the canard then allows the projectile 40 to adjust its trajectory, i.e. steer itself, whilst taking into account of the target position information and the determined at least one of position, velocity or acceleration of the projectile 40.

According to another embodiment, the projectile 40 also comprises a propulsion system which is capable of adjusting the trajectory of the projectile 40, and the control signal generated by the controller 22 is for controlling the propulsion system to propel and/or steer the projectile 40.

Figure 6:
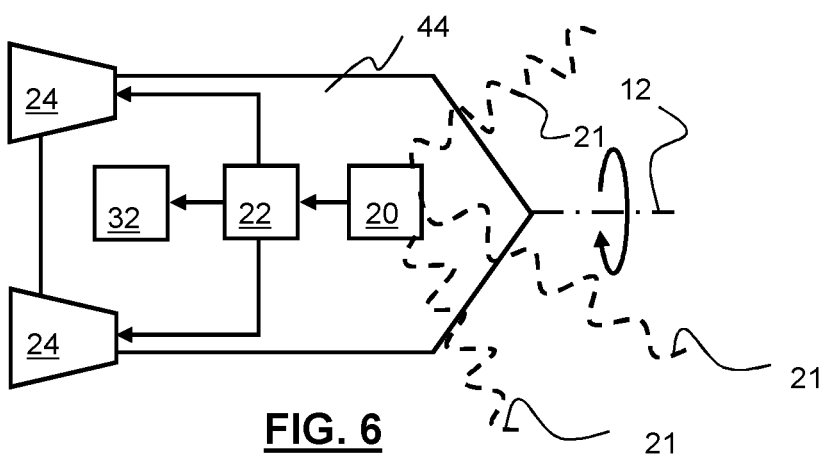

FIG. 6 schematically depicts a projectile 44 according to an example embodiment, wherein the difference from the projectile 40 of FIG. 5 is that the projectile 44 further comprises an activator 32 for activating a fuze. The control signal generated by the controller 22 is for controlling the activator 32 to activate the fuze based on the target position information and the determined at least one of position, velocity or acceleration of the projectile 44. For example, the fuze is activated if a distance between the target position and the determined position of the projectile 44 is within a threshold value. The fuze then initiates detonation of a pay-load in the projectile 44, such as an explosive.

It is understood that according to an embodiment, the activator 32 is for releasing the pay-load of the projectile 44, and the control signal is for releasing the pay-load from the projectile 44 so that the pay-load is projected towards the target when the activator 32 is activated. It is also understood that according to yet another embodiment, the projectile 44 may comprise the activator 32 but not comprise the actuator 24.

FIG. 7 is a flow chart schematically depicting an overview of a method relating to the control system 1000, 2000, 3000 of any one of FIGS. 1 to 2B already described herein. As discussed above, the method relates generally to controlling a projectile, and summarises method steps performed by the control system 1000, 2000, 3000 of any one of FIGS. 1 to 2B. The method comprises: at each transmitter of a plurality of transmitters, transmitting an electromagnetic wave from a transmission position 710; and at the projectile, receiving a plurality of electromagnetic waves transmitted from the plurality of transmitters 730, deriving Doppler measurements from the received plurality of electromagnetic waves 750, determining at least one of a position, a velocity or an acceleration of the projectile from transmission positions of the plurality of transmitters and the derived Doppler measurements 770, and generating a control signal for performing an action with the projectile depending on the determined at least one of position, velocity or acceleration of the projectile 790.

If the transmission positions are pre-arranged before the projectile is fired from a ranged weapon, according to an embodiment the method further comprises storing the pre-arranged transmission positions as data in a memory of the projectile, and the determination step 770 comprises extracting and determining the pre-arranged transmission positions from the data in the memory. If at least one of the plurality of transmitters is capable of determining its own transmission position and transmitting its determined own transmission position, the method may further comprise the at least one of the plurality of transmitters determining its own transmission position at the transmission step 710, and the at least one of the plurality of transmitters communicating the determined own transmission position to the projectile either in the transmitted electromagnetic wave of step 710 or by transmitting another electromagnetic wave. Then the receiving step 730 comprises receiving the electromagnetic wave from the at least one of the plurality of transmitters, and extracting the transmission position from the received electromagnetic wave.

According to an embodiment, the derivation step 750 of the method further comprises correcting the derived Doppler measurements to compensate for a projectile spin, and at the determination step 770 the determining the at least one of a position, a velocity or an acceleration of the projectile is performed using the transmission positions of the plurality of transmitters and the corrected Doppler measurements.

According to an embodiment wherein the projectile also comprises a Global Navigation Satellite System GNSS receiver and/or an Inertial Measurement Unit IMU, the determination step 770 of the method may further comprise determining a position or velocity estimate of the projectile at the GNSS and/or the IMU, and at the determination step 770 the determining the at least one of position, velocity or acceleration of the projectile is performed using the transmission positions; Doppler measurements derived from the received plurality of electromagnetic waves; and the position or velocity estimate determined using the GNSS receiver and/or the IMU. It is understood that the GNSS receiver may provide to the controller pseudo-range measurements rather than the actual position or velocity estimate value. These pseudo-range measurements are then used in a navigation filter to derive a position or velocity estimate.

According to an embodiment wherein the projectile is fired toward a target from a ranged weapon, the method further comprises providing, by the ranged weapon, target position information to the projectile. The control signal generation step 790 of the method may comprise generating a control signal for adjusting a trajectory of the projectile using the target position information and the determined at least one of position, velocity or acceleration of the projectile. If the projectile comprises an actuator for actuating a canard provided on the projectile, the control signal controls the actuator. If the projectile comprises a propulsion system for adjusting the trajectory of the projectile, the control signal controls the propulsion system. According to an embodiment wherein the projectile comprises a pay-load and a fuze, the control signal generation step 790 of the method may comprise generating a control signal for activating the fuze of the projectile using the target position information and the determined at least one of position, velocity or acceleration of the projectile. According to an embodiment wherein the projectile comprises a releasable pay-load and an activator for releasing the pay-load, the control signal generation step 790 of the method may comprises generating a control signal for activating the activator to release the pay-load from the projectile using the target position information and the determined at least one of position, velocity or acceleration of the projectile.

FIG. 8 is a flow chart schematically depicting a related method (or method portion) relating to the control system 2000 of FIG. 2A already described herein. The related method relates generally to controlling a projectile with a plurality of transmitters, wherein at least one transmitter is mobile, i.e. moveable. Compared with the method shown in FIG. 7, the related method further comprises moving the at least one moveable transmitter 810 into a transmission position. According to an embodiment, the moving step 810 comprises positioning the at least one moveable transmitter so that the transmission positions of the plurality of transmitters are dispersed around an expected trajectory of the projectile when fired toward a target. If the at least one moveable transmitter comprises a propulsion system, the moving step 810 comprises using the propulsion system of the at least one moveable transmitter to move the position of the at least one moveable transmitter. If a transmitter vehicle capable of carrying the at least one moveable transmitter is available, the moving step 810 may comprise carrying the at least one moveable transmitter on the transmitter vehicle to the transmission position. The at least one moveable transmitter is moved to the transmission position, and remains stationary at the transmission position when the electromagnetic wave is transmitted at the transmission step 710. According to an embodiment, the at least one moveable transmitter is in motion when the electromagnetic wave is transmitted from its transmission position at the transmission step 710.

According to an embodiment, the moving step 810 of the method further comprises pre-arranging at least one transmission position before the projectile is fired from a ranged weapon, storing the pre-arranged at least one transmission position in a memory provided in the projectile, and moving at least one moveable transmitter to the respective at least one pre-arranged transmission position in preparation for the transmission step 710. The determination step 770 then comprises determining the pre-arranged at least one transmission position from the data stored in the memory of the projectile.

Figure 9:
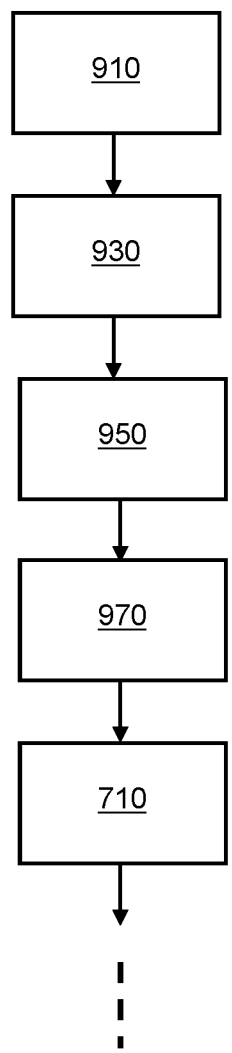
FIG. 9 is a flow chart schematically depicting a related method (or method portion) relating to the control system of FIG. 2B according to an example embodiment.

FIG. 9 is a flow chart schematically depicting a related method (or method portion) relating to the control system 3000 of FIG. 2B already described herein. The related method relates generally to controlling a projectile with a locator. Compared with the method shown in FIG. 7 or FIG. 8, the related method further comprises, at the locator, detecting at least one of the plurality of transmitters 910, determining at least one transmission position of the detected at least one of the plurality of transmitters 930, encoding data for identifying each of the detected at least one transmitters and its determined transmission position on an electromagnetic wave 950, and transmitting that electromagnetic wave to the projectile 970. Then, the transmission step 710 is performed at the plurality of transmitter. The determination step 770 performed at the projectile also comprises receiving the electromagnetic wave from the locator, and retrieving the determined at least one transmission position from the data by decoding data encoded in the received electromagnetic wave.

It is understood that the detecting step 910 to the position transmission step 970 may be performed at any time prior to when the at least one transmission positions are required for the determination step 770. For example, when at least one moveable transmitter is used as described in relation to FIG. 8, the detecting step 910 to the position transmission step 970 are performed after the moving step 810. If at least one of the transmitters is in motion when it is performing the transmission step 710, the detecting step 910 may be performed at the time of the transmission so that the transmission position of the transmitter at the time of transmission is detected and provided to the projectile for use with the determination step 770.

If the locator comprises a propulsion system, the detecting step 910 comprises using the propulsion system of the locator to move the position of the locator as it performs the detecting step 910. If a locator vehicle capable of carrying the locator is available, the detecting step 910 may comprise carrying the locator on the locator vehicle as the locator performs the detecting step 910.

Figure 10:
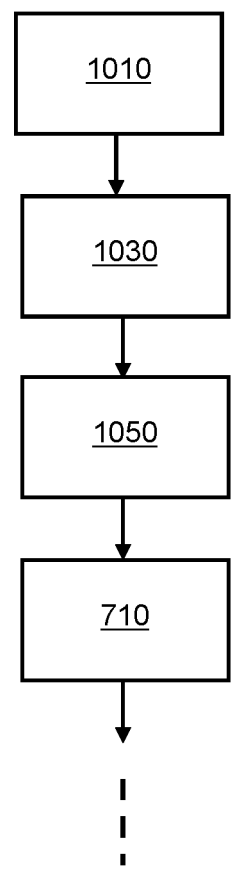
FIG. 10 is a flow chart schematically depicting an overview of a method relating to the control system of any one of FIGS. 1 to 2B according to an example embodiment.

FIG. 10 is a flow chart schematically depicting an overview of a method relating to the control system 1000, 2000, 3000 of any one of FIGS. 1 to 2B already described herein. As discussed above, the method relates generally to controlling a projectile, and summarises method steps performed by the control system 1000, 2000, 3000 of any one of FIGS. 1 to 2B as described in relation to FIGS. 7 to 9. Compared with the method shown in any one of FIGS. 7 to 9, the related method further comprises processing a simulation of a projectile trajectory model or a ballistic model for the projectile with predicted target position information of an intended target, an initial launch condition when the projectile is launched, and a Doppler measurement sampling rate 1010; and determining at least one of optimised number of the plurality of transmitters or optimised transmission positions of the plurality of transmitters for the intended target 1030. The predicted target position information comprises at least one of a predicted range to the intended target or a predicted target position of the intended target. The initial launch condition comprises at least one of a size and/or grade of the projectile, predicted weather conditions at launch such as wind conditions, or an initial launch speed and angle of the projectile.

The method also comprises positioning the plurality of transmitters around a simulated projectile trajectory 1050, wherein the simulated projectile trajectory is determined from the simulation run at the processing step 1010. The simulation based positioning step 1050 uses the determined optimised number of the plurality of transmitters and positions at least one moveable transmitter from the plurality of transmitters at or near the determined optimised transmission positions from the optimised parameter determination step 1030. According to an embodiment, the simulation based positioning step 1050 may also comprise selecting at least one transmitter at or near the determined optimised transmission position, which is determined by the optimised parameter determination step 1030. This enables a subset of the plurality of transmitters at or near the determined optimised transmission positions to be selected in an optimised manner, and be used for the transmission step 710.

It is understood that any transmission, reception and/or communication of an electromagnetic wave described herein may use the electromagnetic wave as a carrier wave having a particular frequency, or having a range of frequencies such as a multi-carrier waveform. According to an example embodiment, the carrier wave is frequency modulated in relation to a signal to be transmitted, thus resulting in a frequency modulated carrier wave. The frequency modulation being preferred over, for instance, an amplitude modulation in terms of the enhanced data transmission capabilities associated with frequency modulation. The nature of any data to be transmitted, received and/or communicated may not be particularly complex, for example involving images, or video, or large streams of data. Instead, the data might be relatively simple, for example comprising only an identification, a 3D position coordinate, a frequency of the carrier wave at transmission, a muzzle velocity, or a target position. As a result, the frequency modulation or similar may not need to be particularly complex in order to achieve the desired result of quickly and easily transmitting relatively small amounts of data to the projectile. Therefore, according to an example embodiment, data to be transmitted to the projectile may be encoded in what could be described as binary form, and in particular by the presence or absence of particular sub-carriers (sometimes known as sub-channels) on the carrier wave (that is, relatively simple frequency-division multiplexing). A controller of the projectile, for example the controller discussed above, then uses the received data in determining at least one of a position, a velocity or an acceleration of the projectile so that a control signal for steering the projectile or activation of the fuze as and when appropriate can be generated. This might be used independently of or in conjunction with, any other sensing that has been undertaken within the projectile or, for example, the IMU output and/or the functionality of GNSS described above.

The data might take any particular form depending of course on the application and nature of the control system, the transmitter, the projectile, the ranged weapon, the locator, and/or any other apparatus for use with the control system, and its intended use. As discussed above, depending on the embodiments and applications of the invention, some or all of data used for controlling the projectile or similar might be pre-stored in the projectile before firing, and/or transmitted to the projectile during or after firing, or a combination thereof. Data that is transmitted might be used to supplement data that is stored, or to verify or validate stored data. Transmitted data might provide data that is impossible or impractical to pre-store, for example data of a transmission position of a mobile transmitter and/or a target that have changed just before, during or after projectile firing. Also, the data might not necessarily be the information described above, but instead be indicative thereof. For instance, the data that is transmitted might not actually be a numerical value that actually equates to a particular position coordinate, but could be data that simply is indicative of that coordinate that would be readily understood and processed by the projectile and the control system thereof. The pre-stored and/or received data may be stored in any convenient manner, for example in a volatile or non-volatile memory.

Of course, the transmission of such data in a wireless manner might be open to reception and inspection by unintended third parties, or possibly even result in interference by such third parties, or interference in general. Additionally and/or alternatively, such wireless transmission/reception can result in crosstalk between ranged weapons/projectiles in proximity to one another. Therefore, the aforementioned transmitters and receivers may comprise one or more directional antennae and/or use cryptography to secure the transmission. The directional antennae may prevent transmission of a signal in, or reception of a signal from, any and all directions, but instead transmission/reception in a particular direction. This might limit potential cross-talk and/or eavesdropping. Similarly, the electromagnetic carrier wave might have properties (e.g. have a power and/or frequency) that results in a suitable transmission range (e.g. in air) for controlling a projectile fired toward a particular target. Within this distance, and by the use of carrier waves, sufficient data may be transmitted to the projectile to be used in the control system as described above, and no more data might need to be transmitted towards or received by the projectile in order to perform an action at the appropriate time. So, with such a short transmission range, the risks of cross-talk, eavesdropping and/or jamming, is also significantly reduced. It is understood that when one or more directional antennae are used, the control system uses transmitters that are in the line-of-sight of the projectile as it travels along its trajectory. It is also understood that a suitable electromagnetic carrier wave frequency, or frequencies if multi-carrier or frequency modulated waveforms are used, might be in the radio frequency range but this may vary depending on the purpose of the electromagnetic carrier wave. The actual details of the transmission and reception hardware are not described in particular detail herein, largely because types of apparatus will be known to and understood by the skilled person after a reading of this disclosure. It is the particular use of that apparatus in this application where the advantages lie, as already described.

For instance, data transmission might be achieved via digital synthesis methods, or via so-called software-defined radio techniques. Decoding at the receiver could be via digital signal processing techniques (e.g. Fast Fourier Transforms or filters). Such a software-defined approach on transmit and receive may be employed, since these may provide greater selectivity (e.g. enabling more efficient use of bandwidth or a greater number of sub-channels or sub-carriers), robustness to interference and the potential to re-programme the system if changes are required (e.g. if different sub-channels or carrier frequencies are required due to a security breach, or to make such a security breach harder to implement). In the description of the apparatus above, some components have been described and shown as being separate, for example a receiver, a controller, an actuator, and an activator. This is only for ease of understanding of the invention, and in other or working examples one or more of the components might be used in combination, be present in the same piece of electronics or software and so on. This is also true where methods have been described, where methods might be described in a step-wise manner for clarity of understanding, but in other or working examples one or more parts of the method might be undertaken in combination, or substantially at the same time, for example the data encoding and transmission described previously, or the reception, extracting and decoding described previously.

The apparatus described above might be completely new apparatus, or existing apparatus re-configured to work in the new and beneficial manner described above. For example, a new ranged weapon might comprise an interface for communicating with a projectile described above, or an existing ranged weapon might be retro-fitted with such an interface, and so on.

A control system according to an example embodiment comprises a number of ground-based Radio Frequency transmitters (also called nodes or beacons) and a navigation receiver contained within a munition shell for receiving Radio Frequency transmissions. The beacons, i.e. transmitters, provide suitable Radio Frequency transmissions for the navigation receiver to determine a 3D position, 3D velocity and 3D acceleration solution (PVA) of the munition shell throughout its trajectory using Doppler-of-Arrival measurements. This Doppler-of-Arrival measurement based determination of PVA is independent of a GNSS and, moreover, does not rely on a GNSS receiver for the operation. This solution provides a direct replacement for GPS units included as part of a Guidance and Navigation segment of a guided munition. The navigation receiver extracts Doppler (relative, or radial, velocity) of the munition with respect to one or more beacons. The combined Doppler measurements from a plurality of beacons provide sufficient information for deriving and/or determining the PVA solution. This PVA solution is continually updated to provide continuous control signals to a Guidance section of the munition shell. The control system can be operated independent of a GNSS and thus obviates any vulnerability due to a GNSS denial via intentional or unintentional interference. The control system can also be operated without the use of an IMU, which are traditionally used in munition shells. IMUs suffer from drift and biases which affect positioning, and which are aggravated by the high accelerations and/or velocities experienced by the munition shells. The control system may also compensate for any projectile spin, whereby it overcomes any accuracy problems arising from the spin, which afflicts other systems such as that uses a GNSS receiver. The radio frequency beacons are placed on the ground or in the air within a line-of-sight of the munition shell as it travels through its trajectory, transmitting signals from which the munition shell can extract Doppler measurements. Moreover, these beacons are identified, i.e. distinguished from one another, through data encoded in the transmitted signals, i.e. in the characteristics of the transmitted signal's waveform. The beacon locations are stored as data in a memory on board the munition shell. Alternatively and/or additionally, if at least one beacon is capable of determining its own location, the at least one beacon's location is carried on the respective beacon's transmission as location data. The transmission is then received, the location data extracted and stored in the munition shell. The beacon transmissions may exploit unmodulated Continuous-Wave (CW) waveforms, with each beacon transmitting on a different spot frequency or frequency band. Alternatively and/or additionally, another identification mechanism may be employed including the use of frequency, phase or amplitude modulated radio frequency signals, with identification through different keyed modulations, which are carried on a single carrier or multiple-carrier waveforms such as coded Orthogonal Frequency-Division Multiplexing (OFDM) waveforms. The coded waveforms may also be used to carry other relevant data such as beacon location data. The control system utilises Doppler-of-Arrival measurements to determine the PVA solution. Alternatively and/or additionally, the control system may also utilise each beacon's transmission's carrier-phase and Doppler-Difference-of-arrival measurements to determine the PVA solution. The control system also utilises an Extended Kalman filter. Alternatively, the control system may utilise other navigation filters such as an Unscented Kalman Filter and/or a Particle Filter. The control system is a self-contained system for self-navigation of munition shells, able to operate even in the complete absence of a GNSS. It is understood that the control system may also be used to provide navigation and/or control capability to any airborne platform or any fast-moving terrestrial platform.

It is understood that in the foregoing example embodiments, a Doppler measurement comprises at least one measurement of a Doppler-of-Arrival and/or a Doppler-Difference-of-arrival (i.e. a differential Doppler or a Frequency difference of arrival) value.

It is also understood that any apparatus and/or system described herein, for example a control system, a transmitter, a transmitter vehicle, a ranged weapon, a projectile, a controller, a receiver, a locator, a locator vehicle, a propulsion system, an actuator, an activator, and so on, may comprise a computer readable medium (for example, a volatile or non-volatile memory or a cache) for storing data including instructions and/or cache data, a processor (for example, an integrated circuit capable of executing the instructions and/or processing the cache data) for processing any data, and an interface (for example a bus for communicating between the computer readable medium and the processor, and/or an input/output unit) for communicating data, whereby the apparatus and/or system performs the relevant functions and/or method as described herein.

It is understood that a transmitter position is the position of the transmitter at any given time, and a transmission position is a transmitter position when the relevant transmitter transmits a relevant electromagnetic wave. So if the transmitter is stationary, i.e. the transmitter is fixed, the transmission position used for the determination of at least one of a position, a velocity, or an acceleration of a projectile will be the same as the transmitter position of that particular transmitter. However, if the transmitter is moveable, the transmission position can vary for each transmission of the respective electromagnetic wave.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A control system for controlling a projectile, the control system comprising:
a plurality of transmitters, wherein each transmitter of the plurality of transmitters is arranged to transmit an electromagnetic wave from a corresponding transmission position, and at least one of the plurality of transmitters is arranged to communicate its own transmission position to the projectile either in the corresponding transmitted electromagnetic wave or by transmitting another electromagnetic wave;
a receiver associated with the projectile, the receiver being arranged to receive a plurality of electromagnetic waves transmitted from the plurality of transmitters, the plurality of electromagnetic waves including the corresponding electromagnetic wave or another electromagnetic wave transmitted by the at least one of the plurality of transmitters; and
a controller associated with the projectile, the controller being arranged to
extract the transmission position of the at least one of the plurality of transmitters from the received corresponding electromagnetic wave or the received another electromagnetic wave,
determine at least one of a position, a velocity, and/or an acceleration of the projectile based on transmission positions of the plurality of transmitters and Doppler measurements derived from the received plurality of electromagnetic waves, and
generate a control signal for performing an action with the projectile depending on the determined at least one of position, velocity, and/or acceleration of the projectile.

2. The control system of claim 1, wherein at least one of the plurality of transmitters is arranged to be mobile.

3. The control system of claim 1, further comprising a locator arranged to:
  detect at least one of the plurality of transmitters;
  determine at least one transmission position of the detected at least one of the plurality of transmitters;
  encode data for identifying each of the detected at least one transmitter and its determined transmission position on an electromagnetic wave; and
  transmit that electromagnetic wave to the projectile, wherein the projectile is arranged to:
    receive, from the locator, the electromagnetic wave; and
    retrieve the determined at least one transmission position from the data by decoding data encoded in the received electromagnetic wave.

4. A weapon comprising: the control system of claim 1, the ranged weapon arranged to fire the projectile toward a target, and provide target position information to the projectile.

5. The ranged weapon of claim 4, wherein the projectile is a steerable projectile, and the action comprises adjusting a trajectory of the projectile using the target position information and the determined at least one of position, velocity, and/or acceleration of the projectile.

6. The ranged weapon of claim 5, wherein the plurality of transmitters are arranged to be positioned so that the transmission positions are dispersed around the trajectory of the projectile.

7. The ranged weapon of claim 4, wherein at least one transmission position is pre-arranged before the projectile is fired from the ranged weapon so that the pre-arranged at least one transmission position is determinable from data stored in a memory provided in the projectile.

8. The ranged weapon of claim 4, wherein the action comprises activating a fuze of the projectile using the target position information and the determined at least one of position, velocity, and/or acceleration of the projectile.

9. The control system of claim 1, further comprising a Global Navigation Satellite System (GNSS) receiver associated with the projectile and/or an Inertial Measurement Unit (IMU) associated with the projectile, wherein the GNSS receiver and/or the IMU is arranged to determine a position and/or velocity estimate of the projectile, and the controller of the projectile is arranged to determine the at least one of position, velocity, and/or acceleration of the projectile from: the transmission positions; the Doppler measurements derived from the received plurality of electromagnetic waves; and a position estimate determined using the GNSS receiver and/or the IMU, or a position estimate determined using pseudo-range measurements from the GNSS receiver.

10. A projectile comprising:
  a receiver arranged to receive a plurality of electromagnetic waves transmitted from a plurality of corresponding transmitters, the plurality of electromagnetic waves including a corresponding electromagnetic wave or another electromagnetic wave transmitted by at least one of the plurality of transmitters that includes a transmission position of the at least one of the plurality of transmitters; and
  a controller arranged to
    extract the transmission position of the at least one of the plurality of transmitters from the received corresponding electromagnetic wave or the received another electromagnetic wave,
    determine at least one of a position, a velocity, and/or an acceleration of the projectile based on respective transmission positions of the plurality of transmitters and Doppler measurements derived from the received plurality of electromagnetic waves, and
    generate a control signal for performing an action with the projectile depending on the determined at least one of position, velocity, and/or acceleration of the projectile.

11. The projectile of claim 10, wherein a locator is arranged to detect at least one of the plurality of transmitters, determine at least one transmission position of the detected at least one of the plurality of transmitters, encode data for identifying each of the detected at least one transmitters and its determined transmission position on an electromagnetic wave, and transmit that electromagnetic wave to the projectile, wherein:
  the receiver is arranged to receive, from the locator, the electromagnetic wave; and
  the controller is arranged to retrieve the determined at least one transmission position from the data by decoding data encoded in the received electromagnetic wave.

12. The projectile of claim 10, wherein the projectile is a steerable projectile, and the action comprises adjusting a trajectory of the projectile using target position information and the determined at least one of position, velocity, and/or acceleration of the projectile, the target position information received by the projectile from a ranged weapon from which the projectile is fired toward a target.

13. The projectile of claim 12, further comprising a memory, wherein at least one transmission position is pre-arranged before the projectile is fired from the ranged weapon so that the pre-arranged at least one transmission position is determinable from data stored in the memory.

14. The projectile of claim 10, wherein the action comprises activating a fuze of the projectile using the target position information and the determined at least one of position, velocity, and/or acceleration of the projectile.

15. The projectile of claim 10, further comprising a Global Navigation Satellite System (GNSS) receiver and/or an Inertial Measurement Unit (IMU), wherein the GNSS receiver and/or the IMU is arranged to determine a position or velocity estimate of the projectile, and the controller is arranged to determine the at least one of position, velocity, and/or acceleration of the projectile from: the transmission positions; the Doppler measurements derived from the received plurality of electromagnetic waves; and a position estimate determined using the GNSS receiver and/or the IMU, or a position estimate determined using pseudo-range measurements from the GNSS receiver.

16. A method of controlling a projectile, the method comprising:
  at each transmitter of a plurality of transmitters, transmitting an electromagnetic wave from a corresponding transmission position, wherein at least one of the plurality of transmitters transmits its own transmission position to the projectile either in the corresponding transmitted electromagnetic wave or by transmitting another electromagnetic wave; and
  at the projectile,
    receiving a plurality of electromagnetic waves transmitted from the plurality of transmitters, the plurality of waves including the corresponding electromagnetic wave or another electromagnetic wave transmitted by the at least one of the plurality of transmitters, extracting the transmission position of the at least one of the plurality of transmitters from the received corresponding electromagnetic wave or the received another electromagnetic wave, determining at least one of a position, a velocity, and/or an acceleration of the projectile based on respective transmission positions of the plurality of transmitters and Doppler measurements derived from the received plurality of electromagnetic waves, and generating a control signal for performing an action with the projectile depending on the determined at least one of position, velocity, and/or acceleration of the projectile.

17. The method of claim 16 further comprising:
at a locator,
  detecting at least one of the plurality of transmitters,
  determining at least one transmission position of the detected at least one of the plurality of transmitters,
  encoding data for identifying each of the detected at least one transmitters and its determined transmission position on an electromagnetic wave, and
  transmitting that electromagnetic wave to the projectile; and
at the projectile,
  receiving the electromagnetic wave from the locator, and
  retrieving the determined at least one transmission position from the data by decoding data encoded in the received electromagnetic wave.

18. The method of claim 16, further comprising:
adjusting, at the projectile, a trajectory of the projectile using target position information and the determined at least one of position, velocity, and/or acceleration of the projectile, the target position information received from a ranged weapon from which the projectile is fired toward a target.

19. The method of claim 18 further comprising activating a fuze of the projectile using the target position information and the determined at least one of position, velocity, and/or acceleration of the projectile.

20. The method of claim 16, wherein the projectile comprises a Global Navigation Satellite System (GNSS) receiver and/or an Inertial Measurement Unit (IMU), and the method further comprises:

at the GNSS receiver and/or the IMU, determining a position or velocity estimate of the projectile; and at the projectile, determining the at least one of position, velocity, and/or acceleration of the projectile from: the transmission positions; the Doppler measurements derived from the received plurality of electromagnetic waves; and a position estimate determined using the GNSS receiver and/or the IMU, or a position estimate determined using pseudo-range measurements from the GNSS receiver.

* * * * *